(12) United States Patent
Alderson et al.

(10) Patent No.: US 7,752,914 B2
(45) Date of Patent: Jul. 13, 2010

(54) MONITORING OF INDEPENDENT VIBRATORS

(75) Inventors: John Alderson, Holland, MI (US);
Steven P. Beavers, Hudsonville, MI (US); Randall J. Beckman, Dorr, MI (US); Joseph D. Wetzel, Hudsonville, MI (US)

(73) Assignee: Venturedyne, Ltd., Pewaukee, WI (US)

( * ) Notice: Subject to any disclaimer, the term of this patent is extended or adjusted under 35 U.S.C. 154(b) by 201 days.

(21) Appl. No.: 11/940,784

(22) Filed: Nov. 15, 2007

(65) Prior Publication Data
US 2009/0126497 A1    May 21, 2009

(51) Int. Cl.
*G01M 7/06* (2006.01)
*B06B 1/18* (2006.01)

(52) U.S. Cl. ....................................... 73/665

(58) Field of Classification Search .................. 73/665, 73/662, 671, 1.57, 1.68, 1.71, 1.72
See application file for complete search history.

(56) References Cited

U.S. PATENT DOCUMENTS

| | | | |
|---|---|---|---|
| 3,710,082 A | | 1/1973 | Sloane et al. |
| 4,181,025 A | | 1/1980 | Abstein, Jr. et al. |
| 4,181,026 A | | 1/1980 | Abstein, Jr. et al. |
| 4,181,027 A | | 1/1980 | Talbott, Jr. |
| 4,181,029 A | | 1/1980 | Talbott, Jr. |
| 4,527,770 A | * | 7/1985 | Vanderburg ............... 251/26 |
| 4,548,067 A | * | 10/1985 | Cox ........................... 73/1.72 |
| 4,557,136 A | * | 12/1985 | Greenhalf ................... 73/1.72 |
| 4,735,089 A | | 4/1988 | Baker et al. |
| 5,517,857 A | | 5/1996 | Hobbs |
| 5,713,240 A | | 2/1998 | Engelmann |

FOREIGN PATENT DOCUMENTS

JP          60164520 A    *   8/1985

OTHER PUBLICATIONS

John Hess. "Real-Time Monitoring and Analysis of Pneumatic Vibration Test Systems Actuators." Equipment Reliability Institute ERI News. May 2004: vol. 15. http://www.vibrationandshock.com/news15/n115.htm.

* cited by examiner

*Primary Examiner*—Hezron Williams
*Assistant Examiner*—Rose M Miller
(74) *Attorney, Agent, or Firm*—Michael Best & Friedrich LLP

(57) ABSTRACT

In a first embodiment of the present invention a method of monitoring individual vibrators in a pneumatic vibration testing system is disclosed. The method includes providing a pneumatic vibration testing system including at least one vibrator, where each vibrator is connected to a pressurized air system through an output of a valve. Pressurized air is then supplied at a known pressure to an input of the valve. When that air is supplied to the valve the valve releases air in measured bursts to the vibrator and the pressure between the valve and the vibrator is monitored. The pressure between the valve and the vibrator is compared to the known pressure, which indicates if the vibrator is failing or has failed. In preferred embodiments, the testing system includes a plurality of vibrators and an equal plurality of valves, each vibrator is connected to the pressurized air system through a single associated valve.

23 Claims, 2 Drawing Sheets

14: Vibrators
20: Solenoid Valves
22: Controller
24a, 24b: Pressure Transducers
26: Accelerometer 14: Vibrators
20: Solenoid Valves
22: Controller
24a, 24b: Pressure Transducers
26: Accelerometer

MONITORING OF INDEPENDENT VIBRATORS

FIELD OF THE INVENTION

This invention is related generally to vibratory testing and, more particularly, to a method and apparatus for monitoring independent vibrators used in vibratory testing.

BACKGROUND OF THE INVENTION

Few products are sold by their manufacturer without some type of testing being conducted. Such testing may be as simple as manually ascertaining whether certain parts are securely affixed—or as complex as "stress testing." In stress testing (or "stress screening" as it is sometimes called), products exhibiting "infant mortality" fail outright during the test. Or as the result of such testing, a product may display evidence of early failure in the operating environment.

One of the most common methods of stress testing involves testing a product by subjecting it to vibrations of the type which might be encountered in actual product use. For example, U.S. Pat. No. 2,438,756 (Larsen) explains that the apparatus described therein is used to vibration-test electrical apparatus for airplanes, ships and the like. The unit described in U.S. Pat. No. 3,748,896 (Barrows) is said to be used for testing parts of a motor vehicle. And vibration testing is often conducted in conjunction with testing using another regimen, e.g., temperature.

One type of vibration testing is known as repetitive shock testing. Such testing is generally accomplished by utilizing a testing apparatus consisting of a table frame that is vibrated by a number of vibrators. These vibrators are generally pneumatically powered. During the testing process a uniform vibration response is desirable because it ensures that all components being tested are exposed to approximately equal vibration levels over the entire table frame. This uniform response is created through the use of those multiple vibrators. However, if one or more of the vibrators have reduced performance, the vibration response becomes non-uniform. Attempting to compensate for this non-uniform testing can create a magnification of stress to certain components in the assembly while minimizing stress to others, potentially yielding a false representation of strengths and weakness in the assembly.

Systems have been developed to monitor vibrators for failure characteristics prior to the point of failure. For example, the V-flare system was developed by a company called Data Flare (no longer in business); this system worked by attaching sensors directly to each vibrator and monitoring the strength of the impacts. This system is an add-on to known systems and introduces extra parts that may fail and add higher cost into the testing procedure.

OBJECTS OF THE INVENTION

It is an object of the invention to provide an improved method and apparatus for testing the vibrators of a vibratory testing system that overcomes some of the problems and shortcomings of the prior art, including those referred to above.

Another object of the invention is to provide an improved method and apparatus for testing the vibrators of a vibratory testing system that is integrated into the system from the design phase.

Another object of the invention is to provide an improved method and apparatus for testing the vibrators of a vibratory testing system that provides improved monitoring.

How these and other objects are accomplished will become apparent from the following descriptions and the drawings.

SUMMARY OF THE INVENTION

In a first embodiment of the present invention a method of monitoring individual vibrators in a pneumatic vibration testing system is disclosed. The method includes providing a pneumatic vibration testing system including at least one vibrator, where each vibrator is connected to a pressurized air system through an output of a valve. Pressurized air is then supplied at a known pressure to an input of the valve. When that air is supplied to the valve the valve releases air in measured bursts to the vibrator and the pressure between the valve and the vibrator is monitored. The pressure between the valve and the vibrator is compared to the known pressure, which indicates if the vibrator is failing or has failed. In preferred embodiments, the testing system includes a plurality of vibrators and an equal plurality of valves, each vibrator is connected to the pressurized air system through a single associated valve.

In another embodiment the testing system further includes a pressure transducer between each vibrator and the associated valve. It is preferred that the system used in the method includes a controller connected to all pressure transducers and that this controller is capable of monitoring pressure data from the pressure transducers. In some preferred embodiments the method then further includes the step of issuing an alert via the controller if a ratio of pressure between the valve and the vibrator of any one of the vibrators to known pressure varies more than a predetermined amount.

In further embodiments the valves are electronically controlled solenoid valves and the solenoid valves are controlled by the controller. In preferred versions of such an embodiment the predetermined amount is a first predetermined amount and the method further includes stopping the flow of air from the solenoid valves to the vibrators via the controller if the ratio of pressure between the valve and the vibrator of any one vibrator to known pressure varies more than a second predetermined amount.

In another embodiment of the present invention a vibration testing system is disclosed. The system includes a table frame and at least one vibrator attached to the table frame. A pneumatic air supply is attached to the vibrator and a valve is connected to the pneumatic air supply for controlling the flow of air to the vibrator. A pressure monitoring device is attached to the pneumatic air supply between the valve and the vibrator and a controller is connected to the pressure monitoring device for monitoring the pressure within the air supply between the valve and the vibrator. It is preferred that the pressure monitoring device is a pressure transducer.

In other embodiments the pressure transducer is a first pressure transducer and the system further includes a second pressure transducer attached to the pneumatic air supply before the valve and attached to the controller. This second transducer allows for monitoring of the pressure supplied to the valve for a more accurate comparison of pressures.

In yet other preferred embodiments the valve is an electronically controlled solenoid valve connected to the controller. Also, other embodiments may include an accelerometer mounted to the table frame and connected to the controller. In a most preferred embodiment the vibrator, solenoid valve and pressure transducer form a vibrator line, and the testing system further includes a plurality of vibrator lines.

In another embodiment of the invention a method of vibration testing an object is disclosed. The method includes providing a pneumatic vibration testing system including a table frame, at least one vibrator attached to the table frame, each vibrator connected to a pressurized air system through an output of a valve. An object to be tested is then attached to the table frame and pressurized air at a known pressure is supplied to an input of the valve thereby powering the vibrators. The pressure between the valve and the vibrator is monitored and that pressure is compared to the known pressure. In preferred embodiments the system includes a plurality of vibrators attached to the table frame and an equal plurality of valves, each vibrator connected to the pressurized air system through a single associated valve.

In still further embodiments the testing system further includes a pressure transducer between each vibrator and the associated valve. It is preferred that the system also include a controller connected to all pressure transducers. In some embodiments the method then further includes the step of issuing an alert via the controller if a ratio of pressure between the valve and the vibrator of any one of the vibrators to known pressure varies more than a predetermined amount. It is highly preferred that the valves of the system are electronically controlled solenoid valves and that the solenoid valves are controlled by the controller.

In other embodiments the predetermined amount is a first predetermined amount and the method further includes the step of stopping the flow of air from the solenoid valves to the vibrators if the ratio of pressure between the valve and the vibrator of any one vibrator to known pressure varies more than a second predetermined amount. In different embodiments the method also includes the step of controlling the solenoid valve to increase the flow of air from the solenoid valve to a vibrator if the ratio of pressure between the valve and the vibrator of that vibrator to known pressure varies more than a third predetermined amount.

DETAILED DESCRIPTION OF THE PREFERRED EMBODIMENTS

Figure 1:
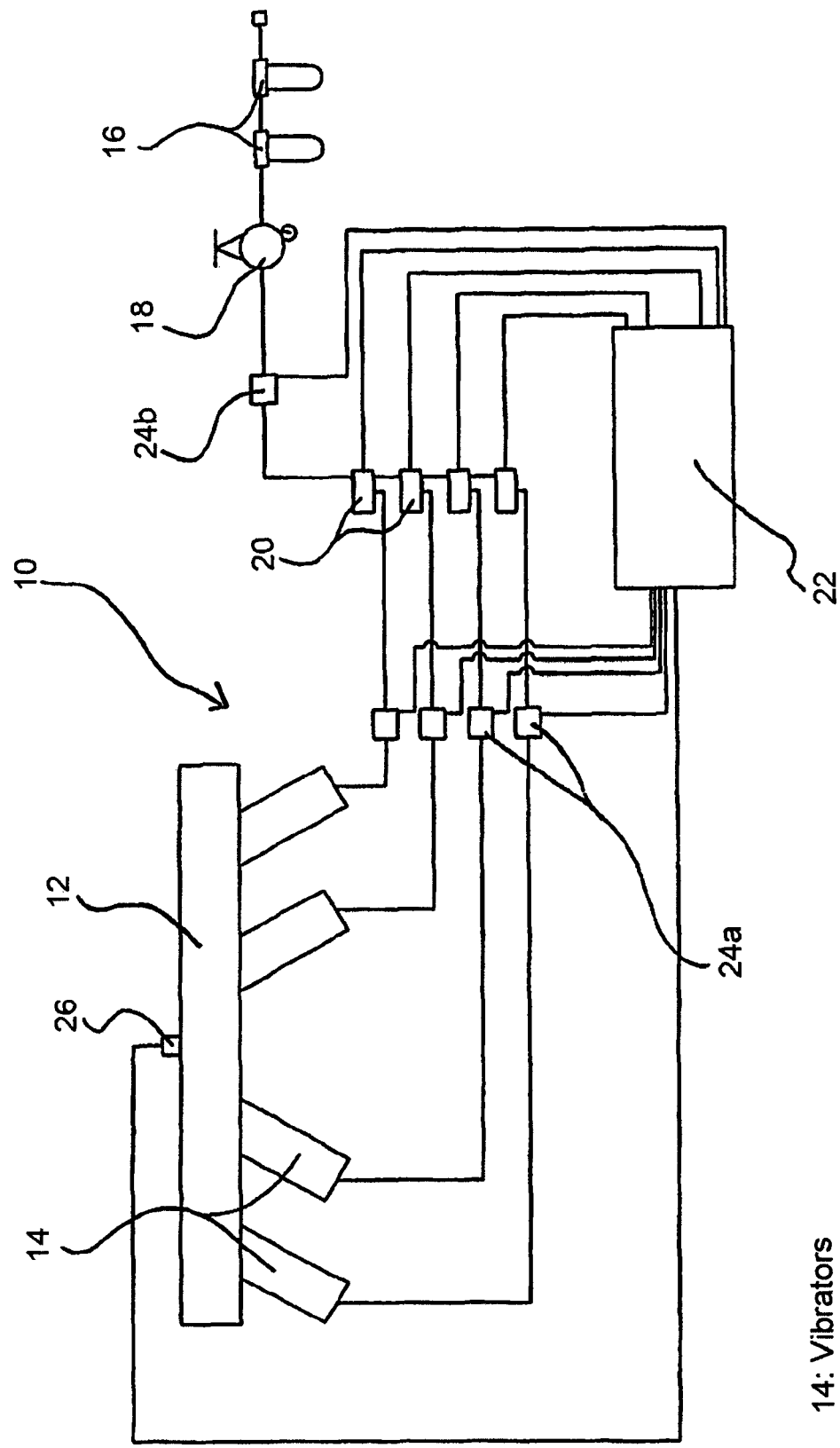
FIG. 1 is a schematic drawing of a preferred embodiment of a vibration testing system.

FIG. 1 is a schematic overview of a preferred embodiment of a vibration testing system 10. The system 10 includes a table frame 12 with a plurality of vibrators 14 attached to the table frame 12 as is known in the art. The vibrators 14 are powered from a pneumatic air supply 16. The air supply 16 is first routed into a regulator 18 that regulates the air from the air supply 16 to a known pressure. From the regulator 18 the air supply 16 is fed to a plurality of electronically controlled solenoid valves 20. As is understood in the art, all connections between the air supply 16 and the vibrators 14 are made through tubing capable of transporting the pressurized air from the air supply 16. In the drawing these are represented by simple lines between the connected pieces. In this preferred embodiment there is one solenoid valve 20 associated with each vibrator 14 and each solenoid valve 20 includes a throttle control (not shown) that allows the valve to allow different amounts of air through. From the solenoid valve 20, air is supplied to the associated vibrator 14. The solenoid valves 20 are in turn connected to a controller 22. Lines in the schematic connecting the controller 22 to other parts are to be understood as electrical connections. The vibrators 14 create vibration that is transferred to the table frame 12; which in turn would vibrate/test an object (not shown) attached to the table.

Each vibrator 14 is controlled via the associated solenoid valve 20 allowing bursts of air from the air supply 16 through to the vibrator 14.

Finally pressure sensors, in the form of pressure transducers 24 are in place to monitor the pressure within the lines connecting the different parts of the system. A first pressure transducer 24a is located between each solenoid valve 20 and its associated vibrator 14. A second pressure transducer 24b is located between the regulator 18 and the solenoid valves 20. All pressure transducers 24 are connected to the controller 22 where they can be monitored and compared.

Figure 2:
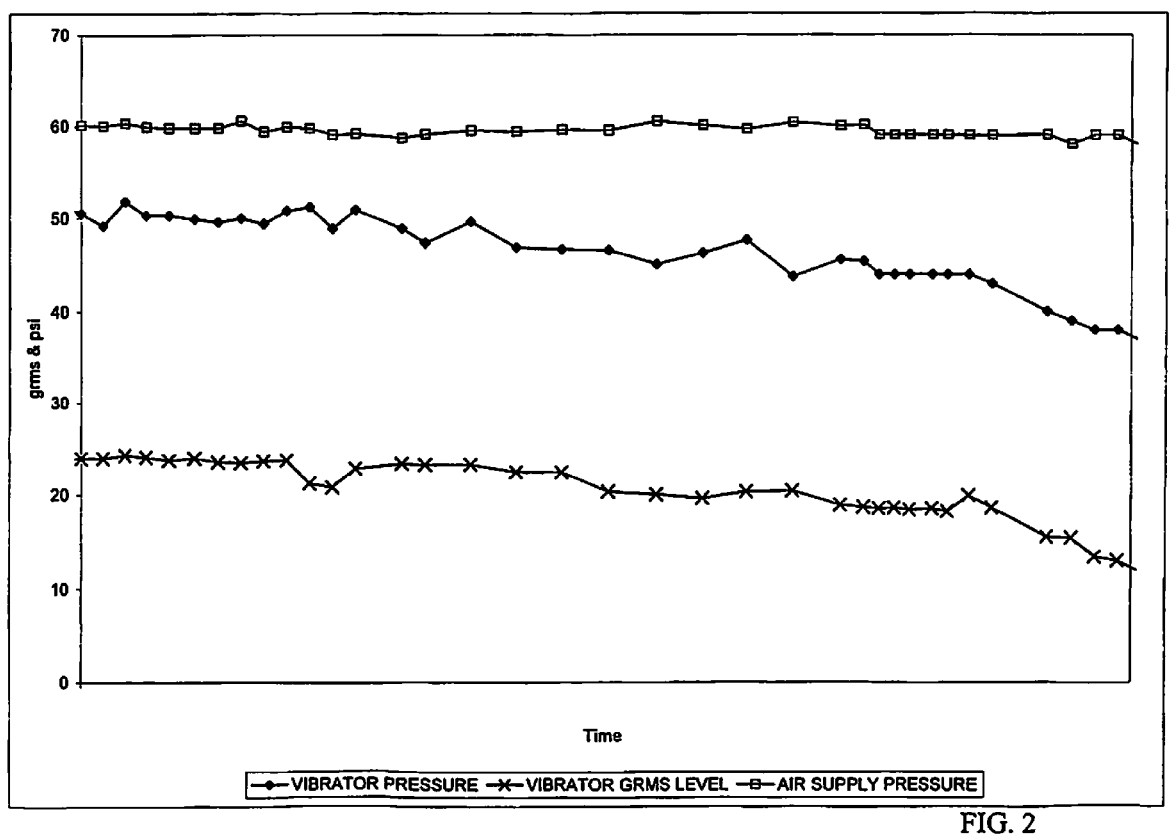
FIG. 2 is a graph showing the failing of a single vibrator over time.

Over time the system 10 will begin to wear, leading to failure. This can occur in a variety of manner. First, and referring now to FIG. 2, as a vibrator 14 wears it uses the bursts of air from the solenoid valves 20 less efficiently. The vibrator 14 leaks air directly through the vibrator 14 rather than utilizing all of the air to power the vibrator 14. As a result, and as shown in the graph, the air pressure in the line between the solenoid valve 20 and the vibrator 14 begins to fall. However, the drop in pressure could come from other system 10 failures as well such as a leaking air line, or failure of the pressure transducer 24a. Any of these failures will lead to the vibrator 14 not running efficiently and thus are included in the concept of monitoring the operation of each individual vibrator as discussed in the present application. As shown in the graph the force of the vibrator (shown in GRMS) begins to fall in relation to the drop in air pressure from whatever cause.

This information is used in a variety of methods. First, after the system 10 is provided and powered from the air supply 16 at a known pressure, the pressure between the solenoid valve 20 and the vibrator 14 can be monitored. By comparing the pressure between the solenoid valve 20 and the vibrator 14 to the known pressure it can be determined if the vibrator's efficiency is failing and, if so, does the vibrator or another component of the system need to be replaced.

Second, the pressure from each first pressure transducer 24a can be compared to the pressure from the second pressure transducer 24b. This comparison, done by the controller 22, will then yield a ratio of pressure from each first transducer to pressure from the second transducer. The controller 22 is then programmed to issue an alert if that ratio varies more than a first predetermined amount. In a third method of use, the controller 22 could also be programmed to shut the vibrators down if the ratio varies more than a second predetermined amount.

Fourth, the controller 22 could be programmed to compensate for a drop in pressure. In this method, the controller can control the individual solenoid valves 20 in response to a drop in pressure between the solenoid valve 20 and its associated vibrator 14. In such a method the controller 22 would monitor that ratio of pressure from each first transducer 24a to the second transducer 24b to sense if that ratio varies more than a third predetermined amount. If such a drop would occur, the controller would increase the flow of air from the corresponding solenoid valve until the ratio matched the third predetermined amount.

In this preferred embodiment all four methods are used simultaneously. In most instances the third predetermined amount would be the first to be reached and thus the controller 22 would control the solenoid valves 20 to allow more air to flow through in each burst thereby increasing the pressure in the line (controlling the throttle of the solenoid valve 20). Since this increase in pressure would tend to make it so the system would compensate for normal wear, the first predetermined amount would only be reached when the vibrator was near failure. In such a circumstance the controller 22 can take into account the extra amount of air being utilized by the solenoid valve 20 when determining if the first predetermined amount has been reached. In other words, the first predetermined amount may be affected by how much the throttle of the solenoid valve 20 is being controlled. Therefore, the operator of the system would be alerted to a future problem but any test that was on-going would not be interfered with. However, these comparisons can be accomplished either as a comparison with a base-line test with the table empty, or as continuous monitoring during the testing of an object attached to the table. It is also preferred that an accelerometer 26 be attached to the table frame 12 and the controller 22 to monitor the strength of the overall vibrations.

While the principles of the invention have been shown and described in connection with specific embodiments, it is to be understood that such embodiments are by way of example and are not limiting.

The invention claimed is:

1. A method of monitoring the efficiency of individual vibrators in a pneumatic vibration testing system with a controller, the method comprising:
   providing a pneumatic vibration testing system including at least one vibrator, the vibrator connected to a pressurized air system through an output of a valve;
   supplying pressurized air at a supply pressure to an input of the valve;
   supplying pressurized air from the outlet of the valve to the vibrator, the pressurized air between the valve and the vibrator having a pressure;
   monitoring the pressure between the valve and the vibrator; and
   issuing an alert indicative of vibrator efficiency in response to at least one of the controller comparing a predetermined ratio to a ratio of the pressure between the valve and the vibrator to the supply pressure and the controller comparing the pressure between the valve and the vibrator to the supply pressure.

2. The method of monitoring individual vibrators in a pneumatic vibration testing system of claim 1 wherein the testing system includes a plurality of vibrators and an equal plurality of valves, each vibrator connected to the pressurized air system through a single associated valve.

3. The method of monitoring individual vibrators in a pneumatic vibration testing system of claim 2 further comprising measuring the pressure between each vibrator and the associated valve with a pressure transducer between each vibrator and the associated valve.

4. The method of monitoring individual vibrators in a pneumatic vibration testing system of claim 3 further comprising providing a signal indicative of each measured pressure to the controller.

5. The method of monitoring individual vibrators in a pneumatic vibration testing system of claim 1 wherein the valve is an electronically controlled solenoid valve and wherein the solenoid valve is controlled by the controller to deliver bursts of pressurized air to the corresponding vibrator during operation of the pneumatic vibration testing system, the method further comprising increasing the amount of pressurized air delivered in each burst from the solenoid valve when the compared pressures or pressure ratios vary more than a first predetermined amount.

6. The method of monitoring individual vibrators in a pneumatic vibration testing system of claim 5 further comprising ceasing delivering bursts of pressurized air from the solenoid valve to the vibrator via the controller when the compared pressures or pressure ratios vary more than a second predetermined amount.

7. A vibration testing system comprising:
   a table frame;
   at least one vibrator attached to the table frame;
   a pneumatic air supply attached to the vibrator through the output of a valve, the pneumatic air supply supplying pressurized air at a supply pressure to the valve;
   a pressure monitoring device attached to the pneumatic air supply between the valve and the vibrator and configured to measure a pressure; and
   a controller connected to the pressure monitoring device, the controller being configured to issue an alert, increase the flow of pressurized air to the vibrator, and stop the flow of air to the vibrator in response to various vibrator efficiencies determined by the controller.

8. The vibration testing system of claim 7 wherein the pressure monitoring device is a pressure transducer.

9. The vibration testing system of claim 8 wherein the pressure transducer is a first pressure transducer, the vibration testing system further comprising a second pressure transducer attached to the pneumatic air supply before the valve and attached to the controller.

10. The vibration testing system of claim 9 wherein the valve is an electronically controlled solenoid valve connected to the controller.

11. The vibration testing system of claim 10 further comprising an accelerometer mounted to the table frame and connected to the controller.

12. The vibration testing system of claim 10 wherein the vibrator, solenoid valve and pressure transducer form a vibrator line, the testing system further comprising a plurality of vibrator lines.

13. The vibration testing system of claim 7, wherein the controller is configured to determine vibrator efficiency by comparing a predetermined ratio to a ratio of the pressure between the valve and the vibrator to the supply pressure.

14. The vibration testing system of claim 7, wherein the controller is configured to determine vibrator efficiency by comparing the pressure between the valve and the vibrator to the supply pressure.

15. A method of vibration testing an object, the method comprising:
   providing a pneumatic vibration testing system including a table frame, at least one vibrator attached to the table frame, the vibrator connected to a pressurized air system through an output of a valve;
   attaching an object to be tested to the table frame;
   supplying pressurized air at a supply pressure to an input of the valve;
   supplying pressurized air from the outlet of the valve to the vibrator thereby powering the vibrator, the pressurized air between the valve and the vibrator having a pressure;
   monitoring the pressure between the valve and the vibrator with a controller;
   the controller recognizing a drop in vibrator efficiency; and
   compensating for the recognized drop in vibrator efficiency by supplying a greater quantity of air through the valve to the vibrator.

16. The method of claim 15 wherein the testing system includes a plurality of vibrators attached to the table frame and an equal plurality of valves, each vibrator connected to the pressurized air system through a single associated valve.

17. The method of claim 16 wherein the testing system further includes a pressure transducer between each vibrator and the associated valve.

18. The method of claim 17 further comprising monitoring the output of all of the pressure transducers with the controller.

19. The method of claim 18 further comprising issuing an alert via the controller identifying the deficient vibrator when a predetermined drop in vibrator efficiency of any one of the vibrators is recognized by the controller.

20. The method of claim 16 wherein the valves are electronically controlled solenoid valves and wherein the solenoid valves are controlled by the controller to deliver bursts of pressurized air to the corresponding vibrators during operation of the pneumatic vibration testing system.

21. The method of claim 15 further comprising
the controller recognizing a further drop in vibrator efficiency; and
cutting off the supply of pressurized air to the vibrator via the valve, thereby de-powering the vibrator.

22. The method of claim 15, wherein the controller recognizes a drop in vibrator efficiency by comparing a predetermined ratio to a ratio of the pressure between the valve and the vibrator to the supply pressure.

23. The method of claim 15, wherein the controller recognizes a drop in vibrator efficiency by comparing the pressure between the valve and the vibrator to the supply pressure.

* * * * *

UNITED STATES PATENT AND TRADEMARK OFFICE
CERTIFICATE OF CORRECTION

PATENT NO. : 7,752,914 B2
APPLICATION NO. : 11/940784
DATED : July 13, 2010
INVENTOR(S) : John Alderson et al.

Page 1 of 1

It is certified that error appears in the above-identified patent and that said Letters Patent is hereby corrected as shown below:

On the title page, item [75]:
Inventors:

change "Randall J. Beckman" to --Randall J. Beekman--

Signed and Sealed this
Sixth Day of December, 2011

David J. Kappos
*Director of the United States Patent and Trademark Office*